US012074292B2

(12) United States Patent
Honda et al.

(10) Patent No.: US 12,074,292 B2
(45) Date of Patent: Aug. 27, 2024

(54) LAMINATED BATTERY

(71) Applicant: Panasonic Intellectual Property Management Co., Ltd., Osaka (JP)

(72) Inventors: Kazuyoshi Honda, Osaka (JP); Eiichi Koga, Osaka (JP); Akira Kawase, Osaka (JP); Noboru Masuda, Nara (JP); Takeshi Yamasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 481 days.

(21) Appl. No.: 17/460,310

(22) Filed: Aug. 30, 2021

(65) Prior Publication Data

US 2021/0391599 A1    Dec. 16, 2021

Related U.S. Application Data

(63) Continuation of application No. PCT/JP2019/044536, filed on Nov. 13, 2019.

(30) Foreign Application Priority Data

Mar. 12, 2019 (JP) ................................. 2019-045153

(51) Int. Cl.
*H01M 10/0585*  (2010.01)
*H01M 10/0525*  (2010.01)
(Continued)

(52) U.S. Cl.
CPC .... *H01M 10/0585* (2013.01); *H01M 10/0525* (2013.01); *H01M 10/0562* (2013.01);
(Continued)

(58) Field of Classification Search
CPC ......... H01M 10/0585; H01M 10/0525; H01M 10/0562; H01M 50/533; H01M 50/534;
(Continued)

(56) References Cited

U.S. PATENT DOCUMENTS 10,079,403 B2 * 9/2018 Grady ................. H01M 50/514
2005/0141170 A1 * 6/2005 Honda ................. C23C 14/042
429/162

FOREIGN PATENT DOCUMENTS

JP    2010-055811    *   3/2010    ............. H01M 2/20
JP    2013-097907        5/2013
(Continued)

OTHER PUBLICATIONS

JP 2010-055811 machine English translation (Year: 2010).*
International Search Report of PCT application No. PCT/JP2019/044536 dated Feb. 4, 2020.

*Primary Examiner* — Michael L Dignan
(74) *Attorney, Agent, or Firm* — Rimon P.C.

(57) ABSTRACT

A laminated battery includes a plurality of battery cells which are laminated and a current collecting lead. Each of the plurality of battery cells has a structure in which a positive electrode current collector, a positive electrode active material layer, a solid electrolyte layer, a negative electrode active material layer, and a negative electrode current collector are laminated in this order. The plurality of battery cells include first and second battery cells adjacent to each other. The first battery cell has a surface that faces the second battery cell and includes an exposed surface not in contact with the second battery cell. At least part of the exposed surface does not overlap the second battery cell when viewed from a laminating direction of the battery cells. The current collecting lead is connected to the exposed surface.

13 Claims, 12 Drawing Sheets

(51) Int. Cl.
    *H01M 10/0562*    (2010.01)
    *H01M 50/533*     (2021.01)
    *H01M 50/534*     (2021.01)
    *H01M 50/536*     (2021.01)

(52) U.S. Cl.
    CPC ........ *H01M 50/533* (2021.01); *H01M 50/534* (2021.01); *H01M 50/536* (2021.01); *H01M 2300/0071* (2013.01)

(58) Field of Classification Search
    CPC ....... H01M 50/536; H01M 2300/0071; H01M 10/052; Y02E 60/10; Y02P 70/50
    See application file for complete search history.

(56) References Cited

FOREIGN PATENT DOCUMENTS

| | | |
|---|---|---|
| JP | 2014-116156 | 6/2014 |
| JP | 2015-153663 | 8/2015 |
| WO | 2015/031365 | 3/2015 |

\* cited by examiner

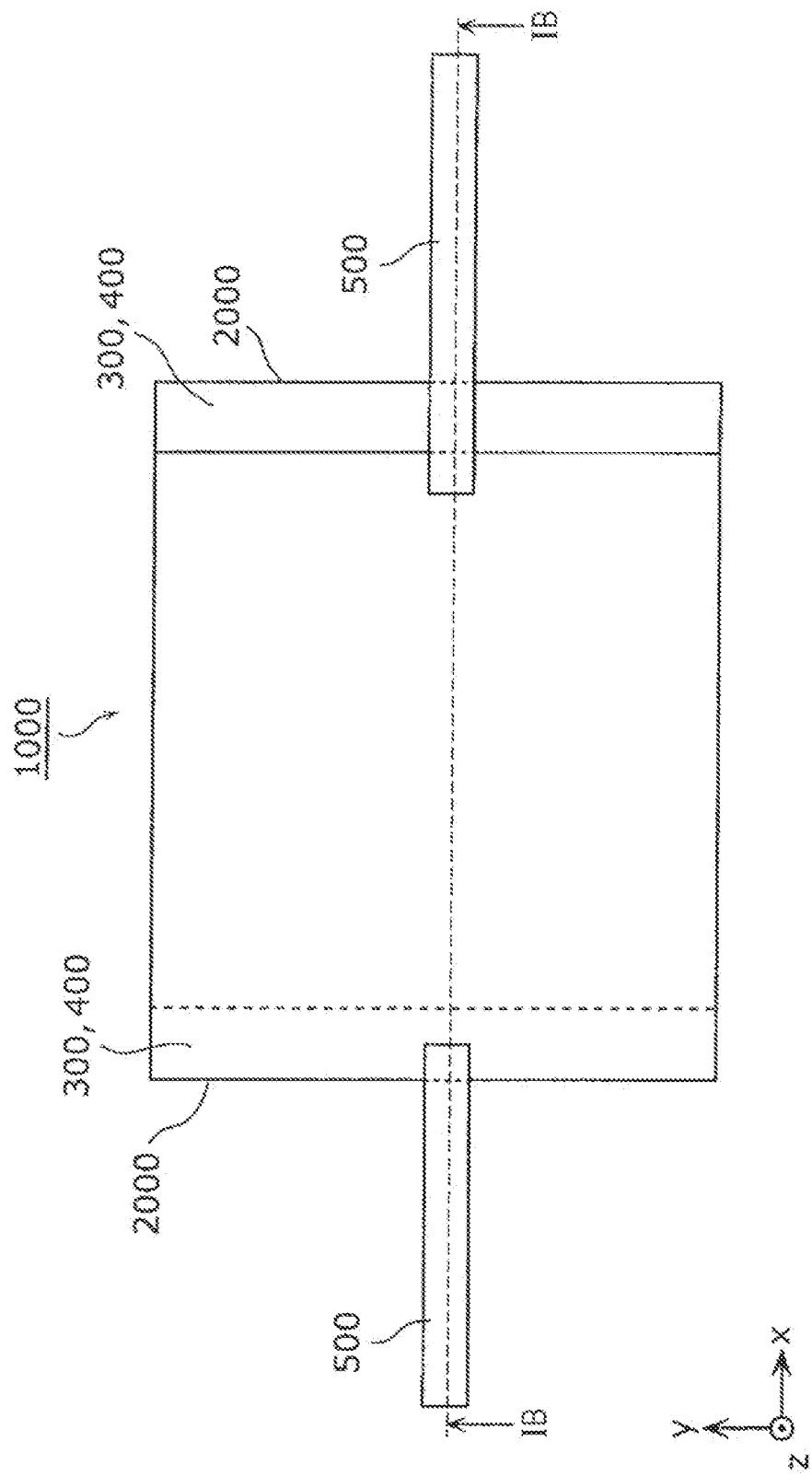

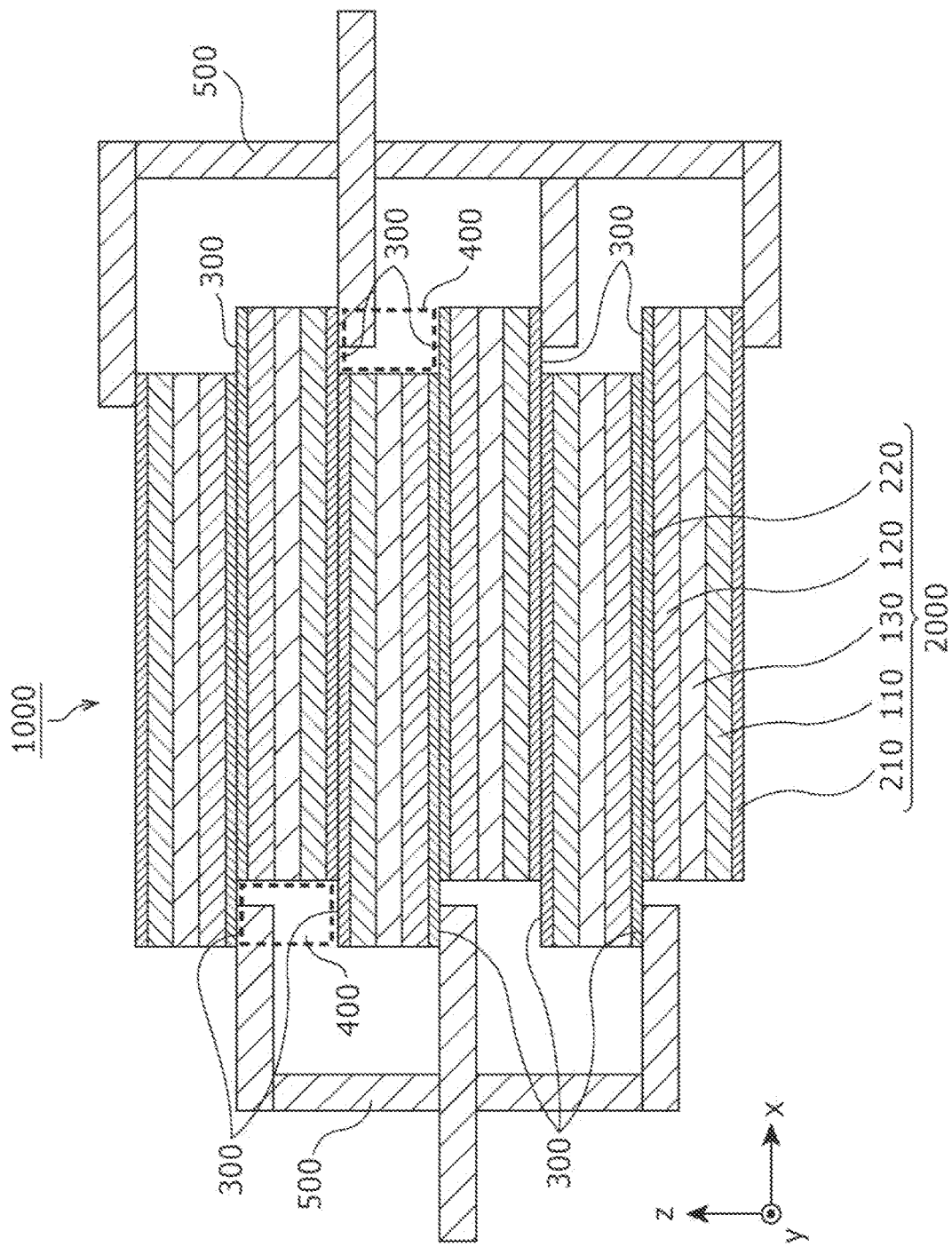

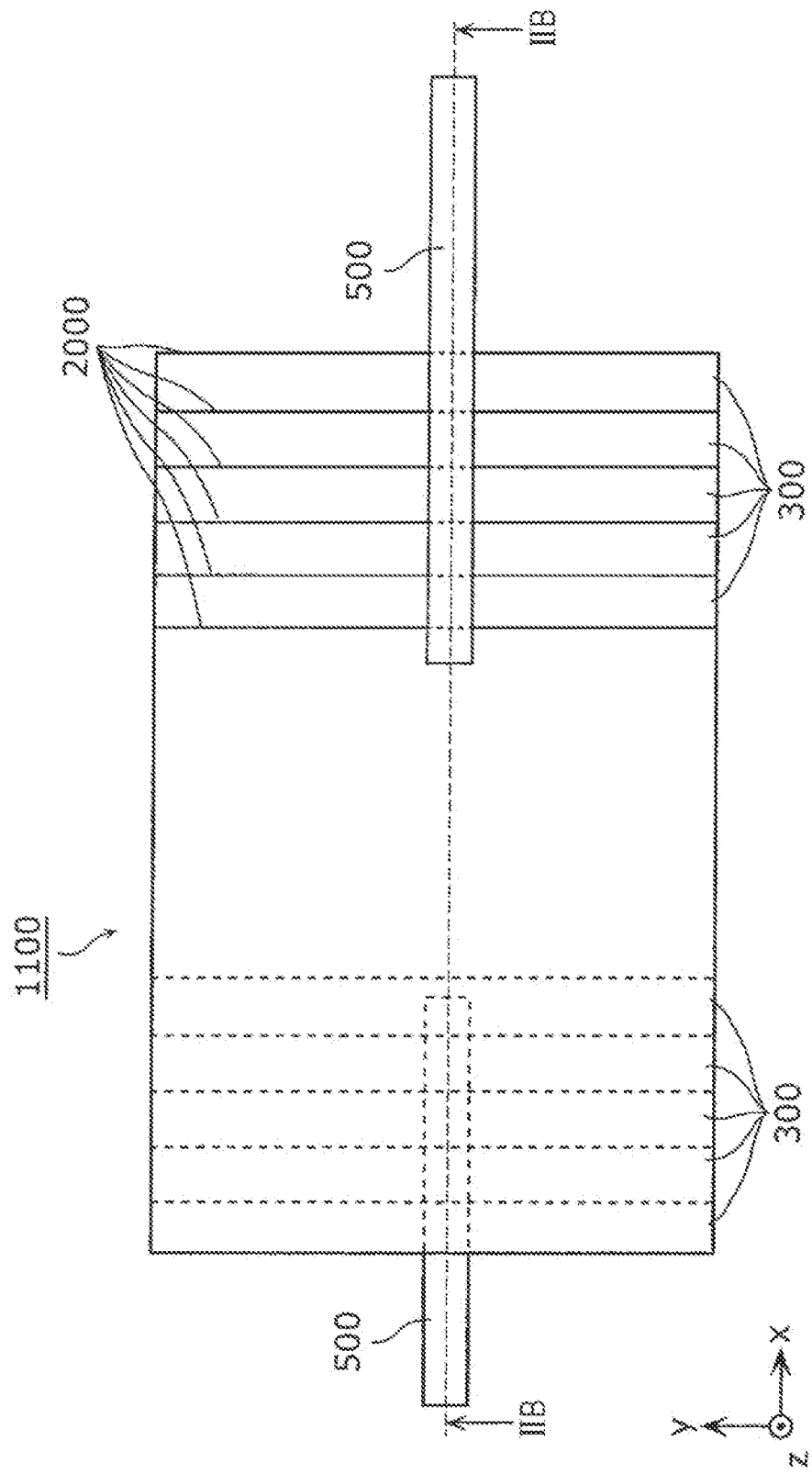

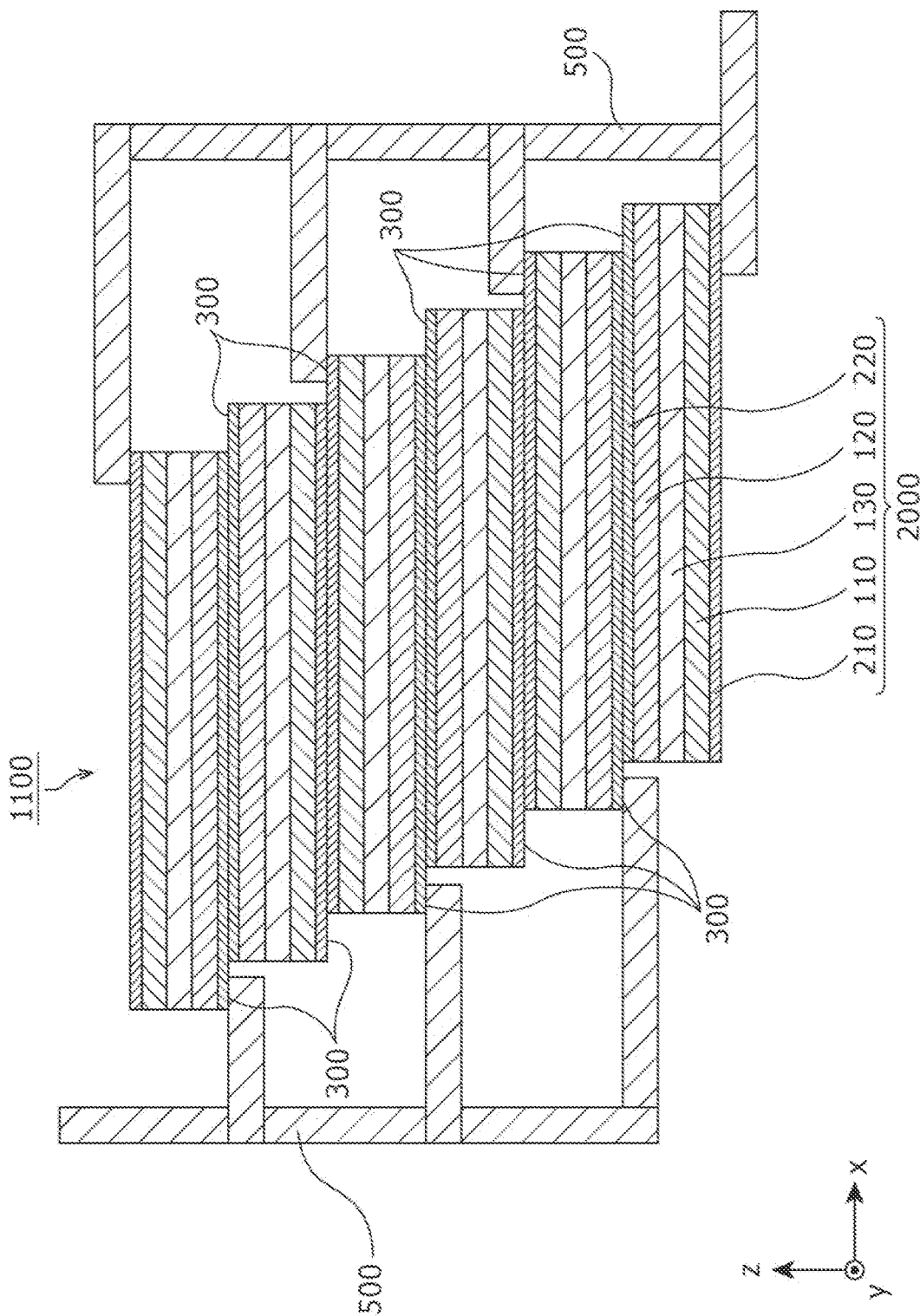

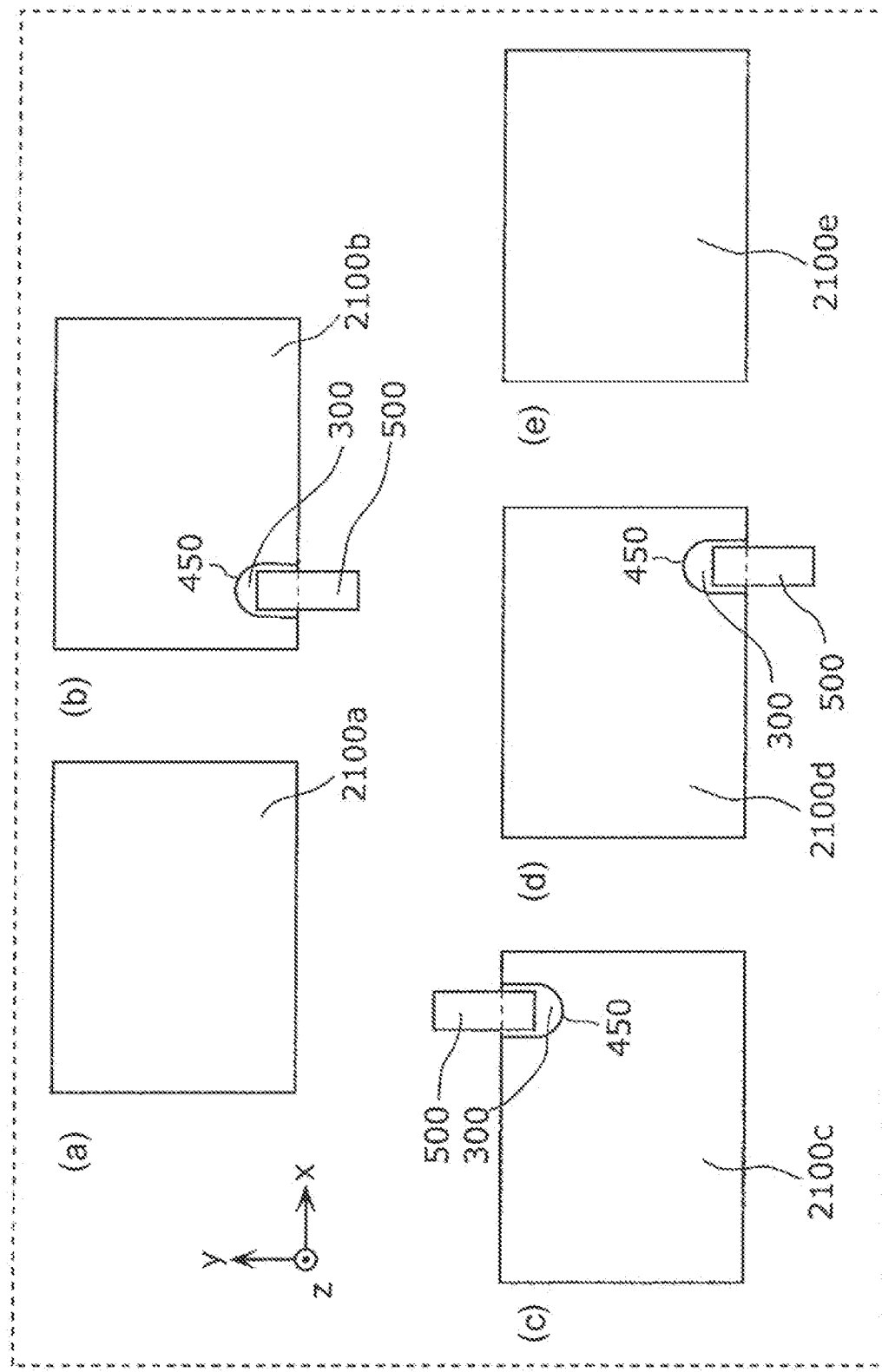

LAMINATED BATTERY

BACKGROUND

1. Technical Field

The present disclosure relates to a laminated battery.

2, Description of the Related Art

Japanese Unexamined Patent Application Publication No. 2013-97907 discloses a battery composed of a laminated battery including leads with different lengths.

Japanese Unexamined Patent Application Publication No. 2014-116156 discloses a bipolar laminated battery including unit cells and internal electrode layers that are laminated alternately with the unit cells.

Japanese Unexamined Patent Application Publication No. 2015-153663 discloses a bipolar secondary battery including positive electrode bodies and negative electrode bodies that differ in size from the positive electrode bodies. The positive and negative electrode bodies are laminated alternately with a solid electrolyte layer interposed between adjacent electrode bodies.

SUMMARY

It is desired to improve the reliability and battery capacity density of the conventional laminated batteries.

One non-limiting and exemplary embodiment provides a laminated battery with improved reliability and battery capacity density.

In one general aspect, the techniques disclosed here feature a laminated battery including a plurality of battery cells which are laminated and a current collecting lead. Each of the plurality of battery cells has a structure in which a positive electrode current collector, a positive electrode active material layer, a solid electrolyte layer, a negative electrode active material layer, and a negative electrode current collector are laminated in this order. The plurality of battery cells include a first battery cell and a second battery cell that are adjacent to each other. The first battery cell has a surface facing the second battery cell. The surface facing the second battery cell includes an exposed surface that is not in contact with the second battery cell. At least part of the exposed surface does not overlap the second battery cell when viewed from a laminating direction of the plurality of battery cells. The current collecting lead is connected to the exposed surface.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a top view showing a schematic structure of a laminated battery in embodiment 1;

FIG. 1B is a cross-sectional view showing the schematic structure of the laminated battery in embodiment 1;

FIG. 2A is a top view showing a schematic structure of battery cells in modification 1 of embodiment 1;

FIG. 2B is a cross-sectional view showing a schematic structure of a laminated battery in modification 1 of embodiment 1;

FIG. 3B shows top views of battery cells included in the laminated battery in modification 2 of embodiment 1;

Figure 3A:
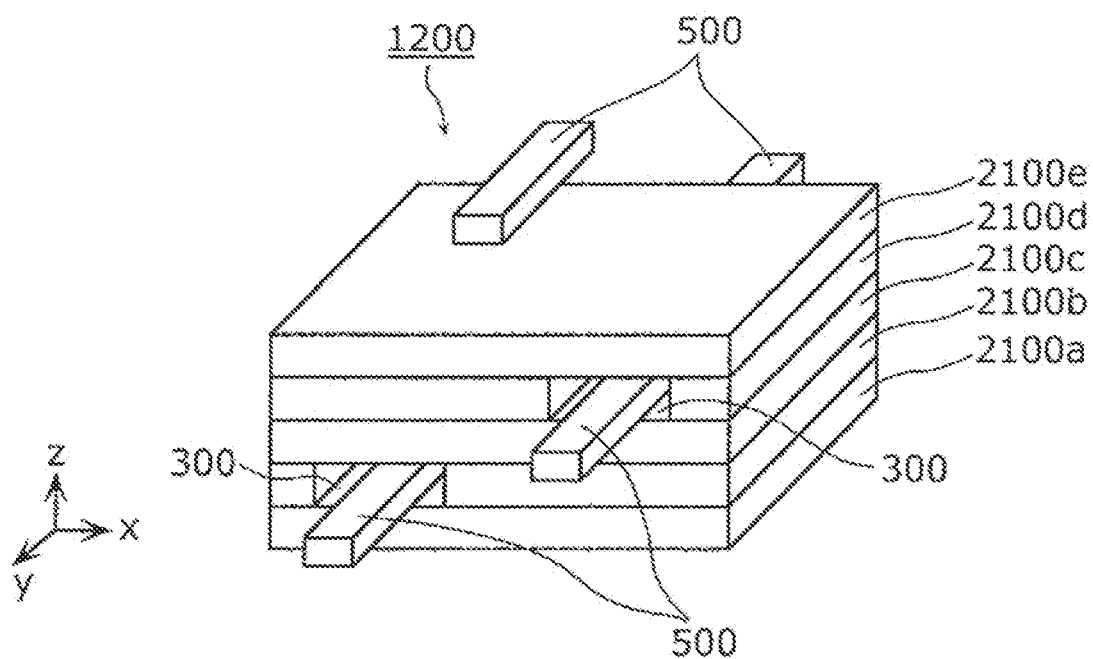
FIG. 3A is a perspective view showing a schematic structure of a laminated battery in modification 2 of embodiment 1.

DETAILED DESCRIPTION (Overview of the Present Disclosure)

A laminated battery in one aspect of the present disclosure includes a plurality of battery cells which are laminated and a current collecting lead. Each of the plurality of battery cells has a structure in which a positive electrode current collector, a positive electrode active material layer, a solid electrolyte layer, a negative electrode active material layer, and a negative electrode current collector are laminated in this order. The plurality of battery cells include a first battery cell and a second battery cell that are adjacent to each other. The first battery cell has a surface facing the second battery cell. The surface facing the second battery cell includes an exposed surface that is not in contact with the second battery cell. At least part of the exposed surface does not overlap the second battery cell when viewed from a laminating direction of the plurality of battery cells. The current collecting lead is connected to the exposed surface.

In the above structure, the current collecting lead is connected to the first battery cell through the use of the exposed surface not in contact with the second battery cell adjacent to the first battery cell. Since the first battery cell has the exposed surface, a space in which no battery cell is present is formed on the exposed surface, and therefore the effective volume of the laminated battery that functions as the battery is smaller than the apparent volume of the laminated battery. However, the current collecting lead is connected without an increase in size in the laminating direction due to, for example, insertion of a lead layer for connecting the current collecting lead. When the battery cells which are laminated in the laminated battery have a flat plate-shape, the increase in size in the laminating direction significantly influences an increase in the volume of the laminated battery. Therefore, by connecting the current collecting lead to the exposed surface, an increase in size in the laminating direction due to a layer that does not contribute to the battery capacity can be prevented, so that the battery capacity density of the laminated battery is improved. In the negative electrode current collector or the positive electrode current collector, the current collecting lead is connected not to an end surface substantially parallel to the laminating direction but to a laminating surface intersecting the laminating direction, so that the area of the connection portion between the current collecting lead and the negative electrode current collector or the positive electrode current collector can be easily increased. Therefore, the current collecting lead is firmly connected to the laminated battery, and the reliability of the laminated battery is improved.

When viewed from the laminating direction of the plurality of battery cells, the entire exposed surface may not overlap the second battery cell. A side surface of the second battery cell may be inclined. In this case, when viewed from the laminating direction of the plurality of battery cells, the exposed surface may include a portion that does not overlap the second battery cell and a portion that overlaps part or all of the inclined side surface of the second battery cell.

For example, a thickness of the current collecting lead in the laminating direction at a position at which the current collecting lead overlaps the exposed surface when viewed from the laminating direction may be smaller than a thickness of the second battery cell in the laminating direction.

In this case, a third battery cell different from the first and second battery cells can be laminated on the upper side of the current collecting lead connected to the exposed surface without contacting the current collecting lead. Specifically, even when the current collecting lead overlaps the third battery cell when viewed from the laminating direction, the current collecting lead is not in contact with the third battery cell. Therefore, restrictions on the laminating shape of the laminated battery are small, so that the laminated battery can have a laminating shape with better volumetric efficiency.

For example, a thickness of the current collecting lead in the laminating direction at a position at which the current collecting lead overlaps the exposed surface when viewed from the laminating direction may be larger than a thickness of the positive electrode current collector included in the second battery cell in the laminating direction or a thickness of the negative electrode current collector included in the second battery cell in the laminating direction.

In this case, since the thickness of the current collecting lead is larger than the thickness of the current collector, the allowable current of the current collecting lead is large. Therefore, even when charging or discharging is performed using a large current, a reduction in the battery characteristics can be reduced.

For example, the plurality of battery cells may be electrically connected in parallel or series.

In this case, when the laminated battery is of the parallel connection type, the laminated battery can be stably charged or discharged using current collecting leads. When the laminated battery is of the series connection type, the laminated battery can be safely charged or discharged while the voltage of each of the battery cells which are laminated is monitored using the current collecting leads.

For example, a position of a side surface of the first battery cell and a position of a side surface of the second battery cell may be displaced from each other in a direction perpendicular to the laminating direction.

In this case, the exposed surface can be formed by simply displacing the laminating positions of the battery cells, and therefore the laminated battery is easily produced.

For example, each of the plurality of battery cells has a first side surface parallel to the laminating direction and a second side surface opposite to the first side surface, and the plurality of battery cells may be disposed such that battery cells displaced in a first side surface direction and battery cells displaced in a second side surface direction are arranged alternately.

In this case, since the battery cells are laminated such that the positional displacements of the battery cells due to laminating cancel each other, an increase in the apparent volume of the laminated battery due to the formation of the exposed surfaces is small. Therefore, the area of the laminated battery as a whole in plan view when viewed from the laminating direction can be small. The battery capacity density of the laminated battery is thereby further improved.

For example, the plurality of battery cells may have the same shape.

In this case, it is unnecessary to produce battery cells with different shapes, so that the laminated battery can be produced easily.

For example, the second battery cell may have a concave portion that is an inwardly recessed edge portion of the second battery cell when viewed from the laminating direction, and at least part of a recessed inner region of the concave portion may overlap the at least part of the exposed surface of the first battery cell when viewed from the laminating direction.

In this case, the exposed surface formed on the surface of the first battery cell that faces the second battery cell overlaps the inner region of the concave portion of the second battery cell when viewed from the laminating direction. Therefore, when the concave portion is formed so as to be suitable for the shape of the current collecting lead, the reduction in the effective volume due to the formation of the exposed surface can be small, so that the battery capacity density of the laminated battery is further improved.

For example, when viewed from the laminating direction, positions of edge portions of the plurality of battery cells may be the same except for the concave portion.

In this case, the first and second battery cells adjacent to each other form a structure in which they are not in contact with each other only in a region overlapping the recessed inner region when viewed from the laminating direction, and the exposed surface is thereby formed. Therefore, the reduction in the effective volume due to the formation of the exposed surface can be small, so that the battery capacity density of the laminated battery is improved.

For example, the exposed surface of the first battery cell and the second battery cell may be joined together through a joint portion formed of an electrically conductive material.

In this case, the mechanical bonding and electrical bonding between the sacked battery cells are more firmly established, and the connection impedance between the battery cells is small. Therefore, the generation of heat is reduced, and the laminated battery has improved large-current characteristics.

Embodiments of the present disclosure will next be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in an independent claim will be described as optional components.

The drawings are schematic drawings and are not necessarily strictly accurate illustrations. Therefore, the scales etc, in the drawings do not always coincide with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification and the drawings, x, y, and z axes are the three axes of a three-dimensional orthogonal coordinate system. In each embodiment, the z axis direction is the laminating direction of the laminated battery. In the present specification, "the thicknesses" of the battery cells, the current collecting lead, the current collectors, and each layer are their lengths in the laminating direction. In the present specification, "the top view" means that the laminated battery is viewed from the laminating direction of the battery cells in the laminated battery. In the present specification, "the side surface" is a surface intersecting a direction perpendicular to the laminating direction of the laminated battery. For example, "the side surface" may be a surface substantially parallel to the laminating direction of the laminated battery. In the present specification, "the laminating surface" is a surface intersecting the laminating direction. "The laminating surface" may be, for example, a surface substantially perpendicular to the laminating direction of the laminated battery.

In the present specification, the terms "above" and "below" in the structure of the laminated battery do not refer to an upward direction (vertically above) and a downward direction (vertically below), respectively, in space recognition in an absolute manner but are used to define relative positional relations based on the laminating order in the laminated structure. The terms "above" and "below" are used not only when two components are disposed with a space therebetween and another component is present between the two components but also when two components are disposed in contact with each other.

Embodiment 1

FIGS. 1A and 1B are illustrations showing a schematic structure of a laminated battery 1000 in embodiment 1. Specifically, FIG. 1A is a top view showing the schematic structure of the laminated battery 1000, and the shapes of components of the laminated battery 1000 in plan view when the laminated battery 1000 is viewed from above in the laminating direction are represented by solid or broken lines. FIG. 1B is a cross-sectional view showing the schematic structure of the laminated battery 1000 and shows a cross section at a position represented by line 1B-1B in FIG. 1A.

As shown in FIGS. 1A and 1B, the laminated battery 1000 in embodiment 1 has a structure in which a plurality of battery cells 2000 are laminated, and the plurality of battery cells 2000 are electrically connected in parallel to thereby form the laminated battery 1000. The laminated battery 1000 further includes current collecting leads 500.

Each of the battery cells 2000 includes a negative electrode current collector 210, a negative electrode active material layer 110, a solid electrolyte layer 130, a positive electrode current collector 220, and a positive electrode active material layer 120. The negative electrode current collector 210 and the positive electrode current collector 220 may be collectively referred to simply as "current collectors."

The negative electrode active material layer 110 and the positive electrode current collector 220 face each other with the solid electrolyte layer 130 therebetween.

Each of the battery cells 2000 has a structure in which the positive electrode current collector 220, the positive electrode active material layer 120, the solid electrolyte layer 130, the negative electrode active material layer 110, and the negative electrode current collector 210 are laminated in this order when the laminated battery 1000 is viewed from above or below in the laminating direction of the battery cells 2000 (the z axis direction). The negative electrode current collector 210, the negative electrode active material layer 110, the solid electrolyte layer 130, the positive electrode current collector 220, and the positive electrode active material layer 120 are laminated so as to overlap each other when the laminated battery 1000 is viewed from the laminating direction and each have a rectangular shape in top view. Among the plurality of battery cells 2000, two adjacent battery cells 2000 are laminated such that their electrode directions are opposite to each other. Specifically, the laminated battery 1000 has a structure in which the plurality of battery cells 2000 are laminated such that, in two adjacent battery cells 2000, their positive electrode current collectors 220 or their negative electrode current collectors 210 are in contact with each other. In this case, the laminated battery 1000 is a parallel laminated battery in which the plurality of battery cells 2000 are electrically connected in parallel.

In the laminated battery 1000, the thicknesses and widths of the positive electrode current collectors 220, the positive electrode active material layers 120, the solid electrolyte layers 130, the negative electrode active material layers 110, and the negative electrode current collectors 210 included in the plurality of battery cells 2000 may be the same for all the plurality of battery cells 2000 or may be different for different battery cells 2000.

The negative electrode active material layers 110 contain, for example, a negative electrode active material as an electrode material. Each negative electrode active material layer 110 is disposed so as to face a corresponding positive electrode active material layer 120.

The negative electrode active material contained in the negative electrode active material layer 110 is, for example, a negative electrode active material such as graphite or metallic lithium. The material used for the negative electrode active material may be any of various materials capable of releasing and occluding ions such as lithium (Li) or magnesium (Mg) ions.

A solid electrolyte such as an inorganic solid electrolyte may be used as a constituent material of the negative electrode active material layer 110. The inorganic solid electrolyte used may be a sulfide solid electrolyte or an oxide solid electrolyte. The sulfide solid electrolyte used may be, for example, a mixture of lithium sulfide ($Li_2S$) and diphosphorus pentasulfide ($P_2S_5$). A conductive material such as acetylene black, carbon black, graphite, or carbon fibers or a binder such as polyvinylidene fluoride may be used as a constituent material of the negative electrode active material layer 110.

The negative electrode active material layer 110 may be produced, for example, by kneading the constituent materials of the negative electrode active material layer 110 with a solvent to prepare a past-like coating material, applying the coating material to the surface of the negative electrode current collector 210, and drying the applied coating material. To increase the density of the negative electrode active material layer 110, an electrode plate including the negative electrode active material layer 110 and the negative electrode current collector 210 may be pressed after drying. The thickness of the negative electrode active material layer 110 is, for example, equal to or more than 5 μm and equal to or less than 300 μm, but this is not a limitation.

Each positive electrode active material layer 120 is a layer containing a positive electrode material such as an active material. The positive electrode material is a material forming a counter electrode for the negative electrode material. The positive electrode active material layer 120 contains, for example, a positive electrode active material.

The positive electrode active material contained in the positive electrode active material layer 120 may be a positive electrode active material such as lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMCO), lithium-nickel-cobalt complex oxide (LNCO), or lithium-nickel-manganese-cobalt complex oxide (LNMCO).

The material used for the positive electrode active material may be any of various materials capable of releasing and occluding ions such as Li or Mg ions.

A solid electrolyte such as an inorganic solid electrolyte may be used as a constituent material of the positive electrode active material layer 120. The inorganic solid electrolyte used may be a sulfide solid electrolyte or an oxide solid electrolyte. The sulfide solid electrolyte used may be, for example, a mixture of lithium sulfide ($Li_2S$) and diphosphorus pentasulfide ($P_2S_5$). The surface of the positive electrode active material may be coated with a solid electrolyte. A conductive material such as acetylene black, carbon black, graphite, or carbon fibers or a binder such as polyvinylidene fluoride may be used as a constituent material of the positive electrode active material layer 120.

The positive electrode active material layer 120 may be produced, for example, by kneading the constituent materials of the positive electrode active material layer 120 with a solvent to prepare a past-like coating material, applying the coating material to the surface of the positive electrode current collector 220, and drying the applied coating material. To increase the density of the positive electrode active material layer 120, an electrode plate including the positive electrode active material layer 120 and the positive electrode current collector 220 may be pressed after drying. The thickness of the positive electrode active material layer 120 is, for example, equal to or more than 5 μm and equal to or less than 300 μm, but this is not a limitation.

The solid electrolyte layer 130 is disposed between the negative electrode active material layer 110 and the positive electrode active material layer 120. The solid electrolyte layer 130 is in contact with each of the negative electrode active material layer 110 and the positive electrode active material layer 120. The solid electrolyte layer 130 is a layer containing an electrolyte material. The electrolyte material used may be a wed-known electrolyte for batteries. The thickness of the solid electrolyte layer 130 may be equal or more than 5 μm and equal to or less than 300 μm or may be equal or more than 5 μm and equal to or less than 100 μm.

The solid electrolyte layer 130 may contain a solid electrolyte. Each battery cell 2000 may be, for example, an all-solid-state electric cell.

The solid electrolyte used may be a solid electrolyte such as an inorganic solid electrolyte. The inorganic solid electrolyte used may be a sulfide solid electrolyte, an oxide solid electrolyte, or a halide solid electrolyte. The sulfide solid electrolyte used may be, for example, a mixture of lithium sulfide ($Li_2S$) and diphosphorus pentasulfide ($P_2S_5$). The solid electrolyte layer 130 may contain, in addition to the electrolyte material, a binder such as polyvinylidene fluoride.

The solid electrolyte layer 130 may be produced, for example, by kneading the constituent materials of the solid electrolyte layer 130 with a solvent to prepare a past-like coating material, applying the coating material to the negative electrode active material layer 110 formed on the negative electrode current collector 210 and/or the positive electrode active material layer 120 formed on the positive electrode current collector 220, and drying the applied coating material. Alternatively, the solid electrolyte layer 130 may be formed by applying the coating material to a carrier film such as a PET film, drying the applied coating material, and transferring the dried coating material onto the negative electrode active material layer 110 formed on the negative electrode current collector 210 and/or the positive electrode active material layer 120 formed on the positive electrode current collector 220 to stack the dried coating material thereon.

In each of the battery cells 2000 in embodiment 1, the negative electrode active material layer 110, the positive electrode active material layer 120, and the solid electrolyte layer 130 are flat plates held parallel to each other. In this case, the occurrence of cracking or collapse due to bending can be prevented. The negative electrode active material layer 110, the positive electrode active material layer 120, and the solid electrolyte layer 130 may be smoothly bent together.

The negative electrode current collector 210 and the positive electrode current collector 220 are each an electrically conductive member. The negative electrode current collector 210 and the positive electrode current collector 220 may each be an electrically conductive thin film. The material used to form the negative electrode current collector 210 and the positive electrode current collector 220 may be a metal such as stainless steel (SUS), aluminum (Al), or copper (Cu).

The negative electrode current collector 210 is disposed in contact with the negative electrode active material layer 110. The negative electrode current collector 210 used may be a metal foil such as a SUS foil or a Cu foil. The thickness of the negative electrode current collector 210 is, for example, equal to or more than 5 μm and equal to or less than 100 μm, but this is not a limitation. For example, a current collector layer that is a layer containing an electrically conductive material may be disposed on a portion of the negative electrode current collector 210 that is in contact with the negative electrode active material layer 110.

The positive electrode current collector 220 is disposed in contact with the positive electrode active material layer 120. The positive electrode current collector 220 used may be a metal foil such as a SUS foil or an Al foil. The thickness of the positive electrode current collector 220 is, for example, equal to or more than 5 μm and equal to or less than 100 μm, but this is not a limitation. For example, a current collector layer that is a layer containing an electrically conductive material may be disposed on a portion of the positive electrode current collector 220 that is in contact with the positive electrode active material layer 120.

Each battery cell 2000 may be produced, for example, by laminating the negative electrode active material layer 110 and the positive electrode active material layer 120 with the solid electrolyte layer 130 disposed therebetween. The battery cell 2000 obtained as described above has a structure in which the positive electrode current collector 220, the positive electrode active material layer 120, the solid electrolyte layer 130, the negative electrode active material layer 110, and the negative electrode current collector 210 are laminated in this order. After these layers have been laminated together, the battery cell 2000 may be pressed from the outer sides of the positive electrode current collector 220 and the negative electrode current collector 210.

As shown in FIGS. 1A and 1B, one of two adjacent battery cells 2000 included in the plurality of battery cells 2000 (this battery cell is hereinafter referred to as a first battery cell) has an exposed surface 300 not in contact with the other battery cell 2000 (hereinafter referred to as a second battery cell) on a surface facing the second battery cell 2000. Specifically, the negative electrode current collector 210 of each of the battery cells 2000 other than the lowermost and uppermost battery cells 2000 has an exposed surface 300 that does not overlap a battery cell 2000 adjacent to the each of the battery cells 2000 when the laminated battery 1000 is viewed from the laminating direction. The positive electrode current collector 220 of each of the battery cells 2000 has an exposed surface 300 that does not overlap a battery cell 2000 adjacent to the each of the battery cells 2000 when the laminated battery 1000 is viewed from the laminating direction. When viewed from the laminating direction, the laminated battery 1000 in embodiment 1 has a structure in which the battery cells 2000 are laminated with part of their side surfaces displaced from each other. Specifically, two adjacent battery cells 2000 are laminated such that the positions of their side surfaces are displaced from each other in the x-axis direction perpendicular to the laminating direction. More specifically, the battery cells 2000 are sequentially laminated such that the positions of their side surfaces are displaced from each other alternately in the positive and negative x-axis directions perpendicular to the laminating direction. Since the battery cells 2000 are laminated in a zigzag manner, the overall area of the laminated battery in plan view when viewed from the laminating direction can be reduced.

When, for example, six battery cells 2000 are laminated, the battery cells 2000 may be laminated in a zigzag manner as shown in FIG. 1B. Alternatively, the battery cells 2000 may be sequentially displaced in the same x-axis direction as shown in FIGS. 2A and 2B described later.

When, for example, six battery cells are laminated, the battery cells laminated may each have a notch formed in a part thereof as shown in FIGS. 3A and 3B described later.

The number of battery cells 2000 which are laminated is not limited to 6, and any number of battery cells 2000 may be laminated together.

The manner of displacing the side surfaces of the battery cells 2000 or the shape of the notches is not limited to the above examples.

FIG. 1B is a schematic cross-sectional view showing an example of part of the laminated battery 1000 that is formed by laminating the plurality of battery cells 2000 using any of various methods such that part of their side surfaces are displaced from each other when the laminated battery 1000 is viewed from the laminating direction.

By laminating the plurality of battery cells 2000 having the same shape such that part of their side surfaces are displaced from each other as shown in FIGS. 1A and 1B, the exposed surfaces 300 are formed. A laminating space 400 in which no battery cell 2000 is present is formed on each exposed surface 300.

Current collecting leads 500 are connected to the respective exposed surfaces 300 of the negative electrode current collectors 210 or the positive electrode current collector 220 of the battery cells 2000 by utilizing the laminating spaces 400. The current collecting leads 500 are lead wires used for, for example, charging/discharging and monitoring of the voltage between terminals. In the laminated battery 1000 including the plurality of battery cells 2000 electrically connected in parallel, the current collecting leads 500 are mainly used for charging/discharging. In FIGS. 1A and 1B, the current collecting leads 500 each have a flat plate shape. However, no particular limitation is imposed on the shape of the current collecting leads 500, and the current collecting leads 500 may have another shape such as a cylindrical shape. The thickness of each current collecting lead 500 is smaller than the thickness of a battery cell 2000 adjacent to the exposed surface 300 of a corresponding battery cell 2000 to which the each current collecting lead 500 is connected. In this manner, even when the battery cells 2000 are laminated in a zigzag manner shown in FIG. 1B, the current collecting leads 500 are connected to the exposed surfaces 300 without being impeded by battery cells 2000 laminated above or below the exposed surfaces 300. The thickness of the current collecting leads 500 is larger than the thicknesses of the positive electrode current collectors 220 and the negative electrode current collectors 210. In this case, the allowable current of the current collecting leads 500 is large, so that a reduction in the battery characteristics can be small. The thickness of the current collecting leads 500 is the length of the current collecting leads 500 in the laminating direction.

A metal such as nickel, stainless steel, aluminum, or copper can be used as the material forming the current collecting leads 500. No particular limitation is imposed on the method for connecting the current collecting leads, and a method such as bonding or welding can be used. Each current collecting lead 500 may be connected to a corresponding current collector using an electrically conductive adhesive or bonding tape. To prevent a short circuit, portions of the current collecting leads 500 that are not connected to the current collectors may be subjected to surface insulation treatment.

The method for connecting the current collecting leads 500 using the laminating spaces 400 on the exposed surfaces 300 has an advantage in that the current collecting leads 500 can be connected without an increase in size in the laminating direction due to, for example, insertion of lead layers that are used for connecting the current collecting leads and do not contribute to the battery capacity. It is necessary to provide spaces extending in in-plane directions of the laminating surfaces and corresponding to the laminating spaces 400 on the exposed surfaces 300. Specifically, since the battery cells 2000 have the exposed surfaces 300, the laminating spaces 400 that do not function as cells are formed, so that the effective volume of the laminated battery 1000 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1000 in the present embodiment. Since the current collecting leads 500 thicker than the current collectors can be connected directly to the current collectors without an increase in size in the laminating direction, the resistance loss and heat generation during charging/discharging are small, and the parallel laminated battery obtained is also excellent in large-current characteristics.

When the battery cells 2000 are laminated such that their side surfaces are displaced from each other in the x-axis direction as in the laminated battery 1000 shown in FIGS. 1A and 1B, the width of the exposed surfaces 300 in the x-axis direction that is the short-side direction of the exposed surfaces 300 may be 0.2 mm or more from the viewpoint of, for example, obtaining the regions for connecting the current collecting leads 500. From the viewpoint of obtaining sufficient battery capacity, the ratio of the width of the exposed surfaces 300 to the width of the battery cells 2000 in the x-axis direction is preferably 5% or less and may be 1% or less.

The laminated battery 1000 is produced, for example, by (1): connecting the current collecting leads 500 to portions of the battery cells 2000 that later become the exposed surfaces 300 in advance; and laminating the battery cells 2000 including the current collecting leads 500 connected thereto so as to be displaced from each other in the x-axis direction such that the laminating structure shown in FIGS. 1A and 1B is obtained. Alternatively, the laminated battery 1000 may be produced by (2): laminating the battery cells 2000 so as to be displaced from each other in the x-axis direction such that the laminating structure shown in FIGS. 1A and 1B is obtained; and, after all the battery cells 2000 have been laminated, connecting the current collecting leads 500 to the respective exposed surfaces 300. Alternatively, the laminated battery 1000 may be produced by (3) repeating a procedure including laminating a battery cell 2000 onto previously battery cells 2000 which are laminated so as to be displaced from each other in the x-axis direction and connecting a current collecting lead 500 to the exposed surface 300 of the last battery cell 2000 to thereby form the laminating structure shown in FIGS. 1A and 1B.

A method suitable for the intended laminating structure may be selected from the methods (1) to (3), or a combination of the methods (1) to (3) may be used to produce the laminated battery 1000. For example, in the case of a laminating structure in which it is difficult to connect the current collecting leads 500 to the exposed surfaces 300 after laminating of the battery cells 2000, the laminated battery 1000 is produced using the method (1). In the case of a laminating structure in which the current collecting leads 500 can be easily connected to the exposed surfaces 300 even after laminating of the battery cells 2000, the laminated battery 1000 is produced using the method (2) or (3). In the laminated battery 1000 shown in FIGS. 1A and 1B, a battery cell 2000 is present above or below each exposed surface 300 to which a current collecting lead 500 is connected. It is therefore difficult to connect the current collecting leads 500 after all the plurality of battery cells 2000 have been laminated, and the method (1) is used to produce the laminated battery 1000.

The laminated battery 1000 may be enclosed in a sealing case. The sealing case used may be, for example, a lamination bag, a metal can, a resin case, etc., but this is not a limitation. By sealing the laminated battery 1000, deterioration of the laminated battery 1000 by moisture can be prevented.

Modifications

A plurality of modifications of embodiment 1 will next be described. In the following description of the plurality of modifications, differences from embodiment 1 or differences between the modifications will be mainly described, and the description of common features will be omitted or simplified.

Modification 1

FIGS. 2A and 2B are illustrations showing a schematic structure of a laminated battery 1100 in modification 1 of embodiment 1. Specifically, FIG. 2A is a top view showing the schematic structure of the laminated battery 1100, and the shapes of components of the laminated battery 1100 in plan view when the laminated battery 1100 is viewed from above in the laminating direction are represented by solid or broken lines. FIG. 2B is a cross-sectional view showing the schematic structure of the laminated battery 1100 and shows a cross section at a position represented by line IIB-IIB in FIG. 2A.

As shown in FIGS. 2A and 2B, the laminated battery 1100 in modification 1 of embodiment 1 includes a plurality of battery cells 2000, and the plurality of battery cells 2000 are electrically connected in parallel to thereby form the laminated battery 1100. The laminated battery 1100 differs from the laminated battery 1000 in embodiment 1 in that the plurality of battery cells 2000 are laminated so as to be displaced from each other in the same direction.

Each of the battery cells 2000 has a structure in which a positive electrode current collector 220, a positive electrode active material layer 120, a solid electrolyte layer 130, a negative electrode active material layer 110, and a negative electrode current collector 210 are laminated in this order when the laminated battery 1100 is viewed from above or below in the laminating direction of the battery cells 2000 (the z axis direction).

As shown in FIGS. 2A and 2B, a first battery cell 2000 among two adjacent battery cells 2000 included in the plurality of battery cells 2000 has an exposed surface 300 not in contact with the second battery cell 2000 on a surface facing the second battery cell 2000. By laminating the plurality of battery cells 2000 such that part of their side surfaces are displaced from each other, the exposed surfaces 300 are formed. Specifically, the laminated battery 1100 has a structure in which the positions of side surfaces of two adjacent battery cells 2000 laminated one on another are displaced from each other in a direction perpendicular to the laminating direction. In this structure, the plurality of battery cells 2000 are laminated such that the positions of their side surfaces are sequentially displaced from each other in the same x-axis direction perpendicular to the laminating direction.

The current collecting leads 500 are connected to the exposed surfaces 300 of the negative electrode current collectors 210 and the positive electrode current collectors 220. This method for connecting the current collecting leads 500 using the exposed surfaces 300 has an advantage in that the current collecting leads 500 can be connected without an increase in size in the laminating direction due to, for example, insertion of lead layers that are used for connecting the current collecting leads and do not contribute to the battery capacity, as in embodiment 1.

In the structure of the laminated battery 1100, since no battery cell 2000 is present above or below each exposed surface 300, the thickness of the current collecting leads 500 can be easily increased. In the laminated battery 1100 shown in FIG. 2B, the thickness of the current collecting leads 500 is smaller than the thickness of the battery cells 2000, but the thickness of the current collecting leads 500 may be larger than the thickness of the battery cells 2000. By increasing the thickness of the current collecting leads 500, the resistance loss and heat generation during charging/discharging can be further reduced.

In the structure of the laminated battery 1100, since no battery cell 2000 is present above or below each exposed surface 300, the current collecting leads 500 can be easily connected even after the battery cells 2000 have been laminated together. Therefore, the laminated battery 1100 can be easily produced even using the method (2) or (3) among the laminated battery production methods described in embodiment 1.

Modification 2

FIGS. 3A and 3B are illustrations showing a schematic structure of a laminated battery 1200 in modification 2 of embodiment 1. Specifically, FIG. 3A is a perspective view showing the schematic structure of the laminated battery 1200. The laminated battery 1200 includes battery cells 2100*a* to 2100*e*. FIG. 3B shows top views of the battery cells 2100*a* to 2100*e* forming the laminated battery 1200. In these illustrations, battery cells above the battery cells 2100*a* to 2100*e* are omitted.

Each of the battery cells 2100*a* to 2100*e* has a structure in which a positive electrode current collector 220, a positive electrode active material layer 120, a solid electrolyte layer 130, a negative electrode active material layer 110, and a negative electrode current collector 210 are laminated in this order when the laminated battery 1200 is viewed from above or below in the laminating direction of the battery cells (the z axis direction), as in the battery cells 2000 in embodiment 1, although these components are not illustrated in FIG. 3A.

As shown in FIG. 3A, the laminated battery 1200 has a structure in which the battery cells 2100*a* to 2100*e* are laminated. As shown in FIGS. 3A and 3B(*b*) to (*d*), each of the battery cells 2100*b* to 2100*d* has formed therein a concave portion 450 that is an inwardly recessed edge portion when the laminated battery 1200 is viewed from the laminating direction. As shown in FIGS. 3B(*a*) and 3B(*e*), no concave portion 450 is formed in each of the battery cells 2100*a* and 2100*e*. As shown in FIGS. 3B(*b*) to (*d*), the battery cells 2100*b* to 2100*d* have their concave portions 450 at different positions. In each of the battery cells 2100*b* to 2100*d*, a battery cell adjacent to each of the battery cells 2100*b* to 2100*d* is present inside its concave portion 450 when the laminated battery 1200 is viewed from the laminating direction. Specifically, since each of the battery cells 2100*b* to 2100*d* has formed therein a corresponding concave portion 450, exposed surfaces 300 not in contact with the each of the battery cells 2100*b* to 2100*d* are formed in battery cells adjacent to the each of the battery cells 2100*b* to 2100*d*.

When the laminated battery 1200 is viewed from the laminating direction, the positions of the edge portions of the battery cells 2100*a* to 2100*e* are the same except for their concave portions 450.

The current collecting leads 500 are connected to the respective exposed surfaces 300 by utilizing the inner spaces of the respective concave portions 450. This method for connecting the current collecting leads 500 by utilizing the inner spaces of the concave portions 450 on the exposed surfaces 300 has an advantage in that the current collecting leads 500 can be connected without an increase in size in the laminating direction due to, for example, insertion of lead layers that are used for connecting the current collecting leads and do not contribute to the battery capacity. Although it is necessary to provide spaces extending in in-plane directions of the laminating surfaces and corresponding to the inner spaces of the concave portions 450, it is only necessary that spaces allowing the current collecting leads 500 to be connected be provided, and this allows the laminated battery to have sufficient battery capacity density.

The battery cells 2100*b* to 2100*d* with the concave portions 450 formed therein can be produced, for example, by preparing battery cells with no concave portions 450 formed therein and cutting the battery cells in the laminating direction using a blade, a drill, or a laser beam. No particular limitation is imposed on the cut shape of each concave portion 450 when it is viewed from the laminating direction. From the viewpoint of preventing chipping etc. of each layer, the inner cut shape of the concave portion 450 when it is viewed from the laminating direction is preferably a curved shape, as shown in FIG. 3B.

Modification 3

Figure 4:
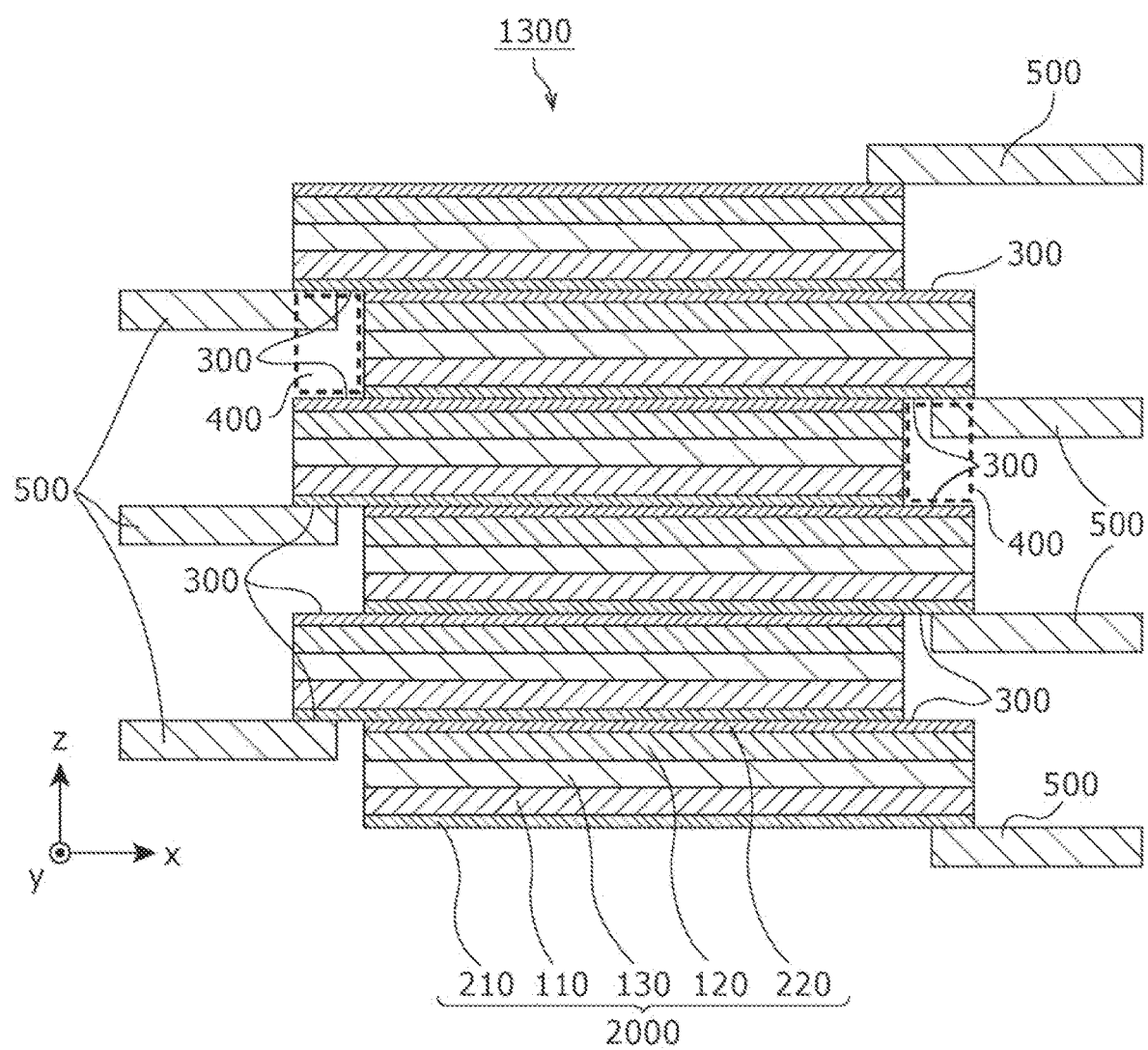
FIG. 4 is a cross-sectional view showing a schematic structure of a laminated battery in modification 3 of embodiment 1.

FIG. 4 is a cross-sectional view showing a schematic structure of a laminated battery 1300 in modification 3 of embodiment 1.

As shown in FIG. 4, the laminated battery 1300 in modification 3 of embodiment 1 includes a plurality of battery cells 2000, and the plurality of battery cells 2000 are electrically connected in series to thereby form the laminated battery 1300. The laminated battery 1300 differs from the laminated battery 1000 in embodiment 1 in that the plurality of battery cells 2000 are electrically connected in series. The laminating shape of the plurality of battery cells 2000 in the laminated battery 1300 is the same as that in the laminated battery 1000 in embodiment 1, and the shape of the laminated battery 1300 in top view is the same as that of the laminated battery 1000 shown in FIG. 1A.

Each of the battery cells 2000 includes a negative electrode current collector 210, a negative electrode active material layer 110, a solid electrolyte layer 130, a positive electrode current collector 220, and a positive electrode active material layer 120.

Each of the battery cells 2000 has a structure in which the positive electrode current collector 220, the positive electrode active material layer 120, the solid electrolyte layer 130, the negative electrode active material layer 110, and the negative electrode current collector 210 are laminated in this order in the laminating direction of the battery cells 2000 (the z axis direction). In the laminated battery 1300, the battery cells 2000 are laminated as follows. A first battery cell 2000 and a second battery cell 2000 that are two battery cells 2000 adjacent to each other are laminated such that the positive electrode current collector 220 of the first battery cell 2000 is in contact with the negative electrode current collector 210 of the second battery cell 2000. In this case, the laminated battery 1300 is a series connection laminated battery including the plurality of battery cells 2000 electrically connected in series.

FIG. 4 is a schematic cross-sectional view showing an example of part of the laminated battery 1300 that is formed by laminating the plurality of battery cells 2000 using any of various methods such that part of their side surfaces are displaced from each other when the laminated battery 1300 is viewed from the laminating direction, as in embodiment 1.

Among two adjacent battery cells 2000 included in the plurality of battery cells 2000, the first battery cell 2000 has an exposed surface 300 not in contact with the second battery cell 2000 on a surface facing the second battery cell 2000, as shown in FIG. 4. Specifically, the negative electrode current collector 210 of each of the battery cells 2000 except for the lowermost battery cell 2000 has an exposed surface 300 that does not overlap a battery cell 2000 adjacent to the each of the battery cells 2000 when the laminated battery 1300 is viewed from the laminating direction. The positive electrode current collector 220 of each of the battery cells 2000 except for the uppermost battery cell 2000 has an exposed surface 300 that does not overlap a battery cell 2000 adjacent to the each of the battery cells 2000 when the laminated battery 1300 is viewed from the laminating direction.

By laminating the plurality of battery cells 2000 such that part of their side surfaces are displaced from each other when the laminated battery 1300 is viewed from the laminating direction, the exposed surfaces 300 are formed, A laminating space 400 in which no battery cell 2000 is present is formed on each exposed surface 300.

Current collecting leads 500 are connected to the respective exposed surfaces 300 of the negative electrode current collectors 210 or the positive electrode current collector 220 of the battery cells 2000 by utilizing the laminating spaces 400. In the laminated battery 1300 including the plurality of battery cells 2000 electrically connected in series, the current collecting leads 500 connected to the exposed surfaces 300 are used mainly to monitor the voltage between terminals.

This method for connecting the current collecting leads 500 using the laminating spaces 400 on the exposed surfaces 300 has an advantage in that the current collecting leads 500 can be connected without an increase in size in the laminating direction due to, for example, insertion of lead layers that are used for connecting the current collecting leads and do not contribute to the battery capacity, as in embodiment 1. It is necessary to provide spaces extending in in-plane directions of the laminating surfaces and corresponding to the laminating spaces 400 on the exposed surfaces 300. Specifically, since the battery cells 2000 have the exposed surfaces 300, the laminating spaces 400 that do not function as cells are formed, so that the effective volume of the laminated battery 1300 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1300 in the present embodiment. Since the inter-terminal voltage between battery cells 2000 can be monitored without an increase in size in the laminating direction, the high-capacity series connected laminated battery obtained can be excellent in safety.

Modification 4

Figure 5:
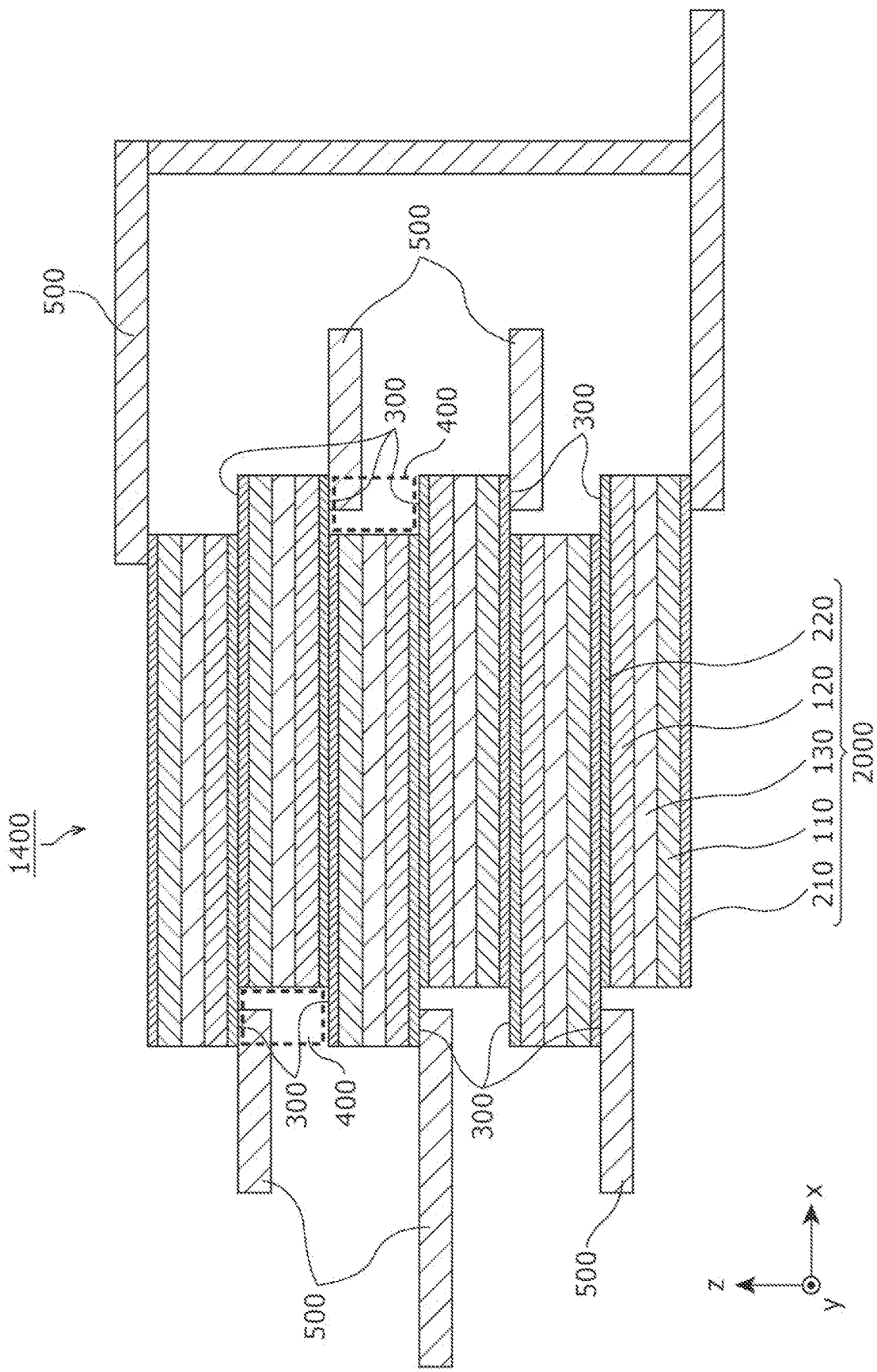
FIG. 5 is a cross-sectional view showing a schematic structure of a laminated battery in modification 4 of embodiment 1.

FIG. 5 is a cross-sectional view showing a schematic structure of a laminated battery 1400 in modification 4 of embodiment 1.

As shown in FIG. 5, the laminated battery 1400 in modification 4 of embodiment 1 includes a plurality of battery cells 2000, and the plurality of battery cells 2000 are electrically connected to form the laminated battery 1400. The laminated battery 1400 differs from the laminated battery 1000 in embodiment 1 in that the plurality of battery cells 2000 are electrically connected in a combination of parallel and series connections. The laminating shape of the plurality of battery cells 2000 in the laminated battery 1400 is the same as that in the laminated battery 1000 in embodiment 1, and the shape of the laminated battery 1400 in top view is the same as the shape of the laminated battery 1000 shown in FIG. 1A.

Each of the battery cells 2000 includes a negative electrode current collector 210, a negative electrode active material layer 110, a solid electrolyte layer 130, a positive electrode current collector 220, and a positive electrode active material layer 120.

FIG. 5 is a schematic cross-sectional view showing an example of part of the laminated battery 1400 that is formed by laminating the plurality of battery cells 2000 using any of various methods such that part of their end surfaces are displaced from each other.

In FIG. 5, the plurality of battery cells 2000 are electrically connected in a combination of parallel and series connections. Specifically, two adjacent battery cells 2000 in a series connection portion are laminated such that the positive electrode current collector 220 of a first battery cell 2000 is in contact with the negative electrode current collector 210 of a second battery cell 2000. Two adjacent battery cells 2000 in a parallel connection portion are laminated such that their positive electrode current collectors 220 or their negative electrode current collectors 210 are in contact with each other.

Among two adjacent battery cells 2000 included in the plurality of battery cells 2000, the first battery cell 2000 has an exposed surface 300 not in contact with the second battery cell 2000 on a surface facing the second battery cell 2000, as shown in FIG. 5. Specifically, the negative electrode current collector 210 of each of the battery cells 2000 except for the lowermost and uppermost battery cells 2000 has an exposed surface 300 that does not overlap a battery cell 2000 adjacent to the each of the battery cells 2000 when the laminated battery 1400 is viewed from the laminating direction. The positive electrode current collector 220 of each of the battery cells 2000 has an exposed surface 300 that does not overlap a battery cell 2000 adjacent to the each of the battery cells 2000 when the laminated battery 1400 is viewed from the laminating direction.

By laminating the plurality of battery cells 2000 such that part of their side surfaces are displaced from each other when the laminated battery 1400 is viewed from the laminating direction, the exposed surfaces 300 are formed. A laminating space 400 in which no battery cell 2000 is present is formed on each exposed surface 300.

Current collecting leads 500 are connected to the respective exposed surfaces 300 of the negative electrode current collectors 210 or the positive electrode current collectors 220 of the battery cells 2000 by utilizing the laminating spaces 400.

This method for connecting the current collecting leads 500 using the laminating spaces 400 on the exposed surfaces 300 has an advantage in that the current collecting leads 500 can be connected without an increase in size in the laminating direction due to, for example, insertion of lead layers that are used for connecting the current collecting leads and do not contribute to the battery capacity. It is necessary to provide spaces extending in in-plane directions of the laminating surfaces and corresponding to the laminating spaces 400 on the exposed surfaces 300. Specifically, since the battery cells 2000 have the exposed surfaces 300, the laminating spaces 400 that do not function as cells are formed, so that the effective volume of the laminated battery 1400 decreases. However, in particular, when the size of the laminated battery is large, it is important to reduce the increase in size in the laminating direction due to the layers that do not contribute to the battery capacity in order to allow the laminated battery to have sufficient battery capacity density, and the influence of the small spaces extending in the in-plane directions of the laminating surfaces on the battery capacity density is smaller than the influence of an increase in size in the laminating direction on the battery capacity density. The smaller the ratio of the thickness in the laminating direction to the side length in an in-plane direction of the laminating surfaces, the more effective the laminated battery 1400 in the present embodiment. Since the current collecting leads 500 thicker than the current collectors can be connected directly to the current collectors, the high-capacity laminated battery obtained using a combination of parallel and series connections is excellent in large-current characteristics. Moreover, the inter-terminal voltage between battery cells can be monitored.

Embodiment 2

Embodiment 2 will next be described. In the following description, differences from embodiment 1 and the modifications will be mainly described, and the description of common features will be omitted or simplified.

Figure 6:
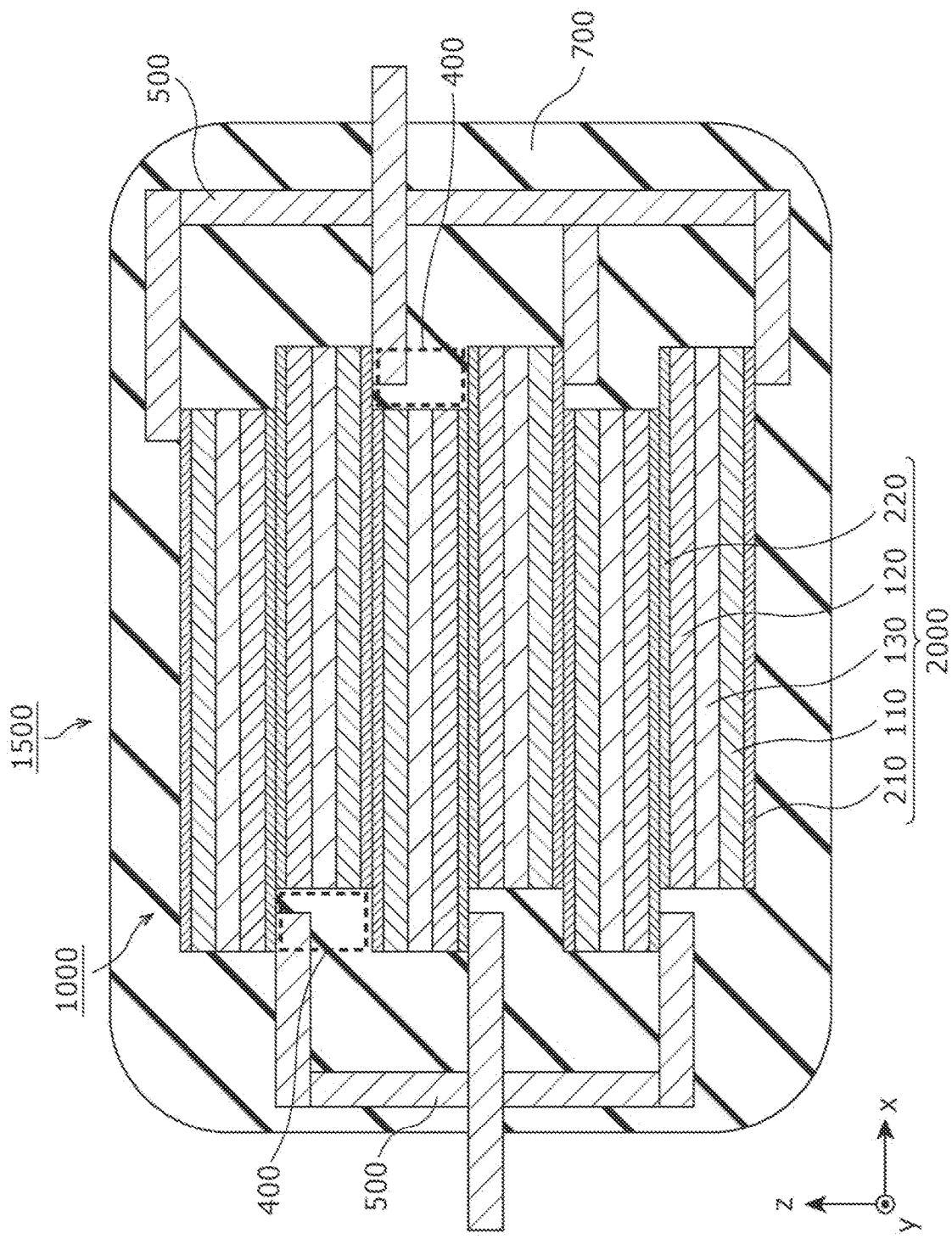
FIG. 6 is a cross-sectional view showing an example of a schematic structure of a laminated battery in embodiment 2.
Figure 7:
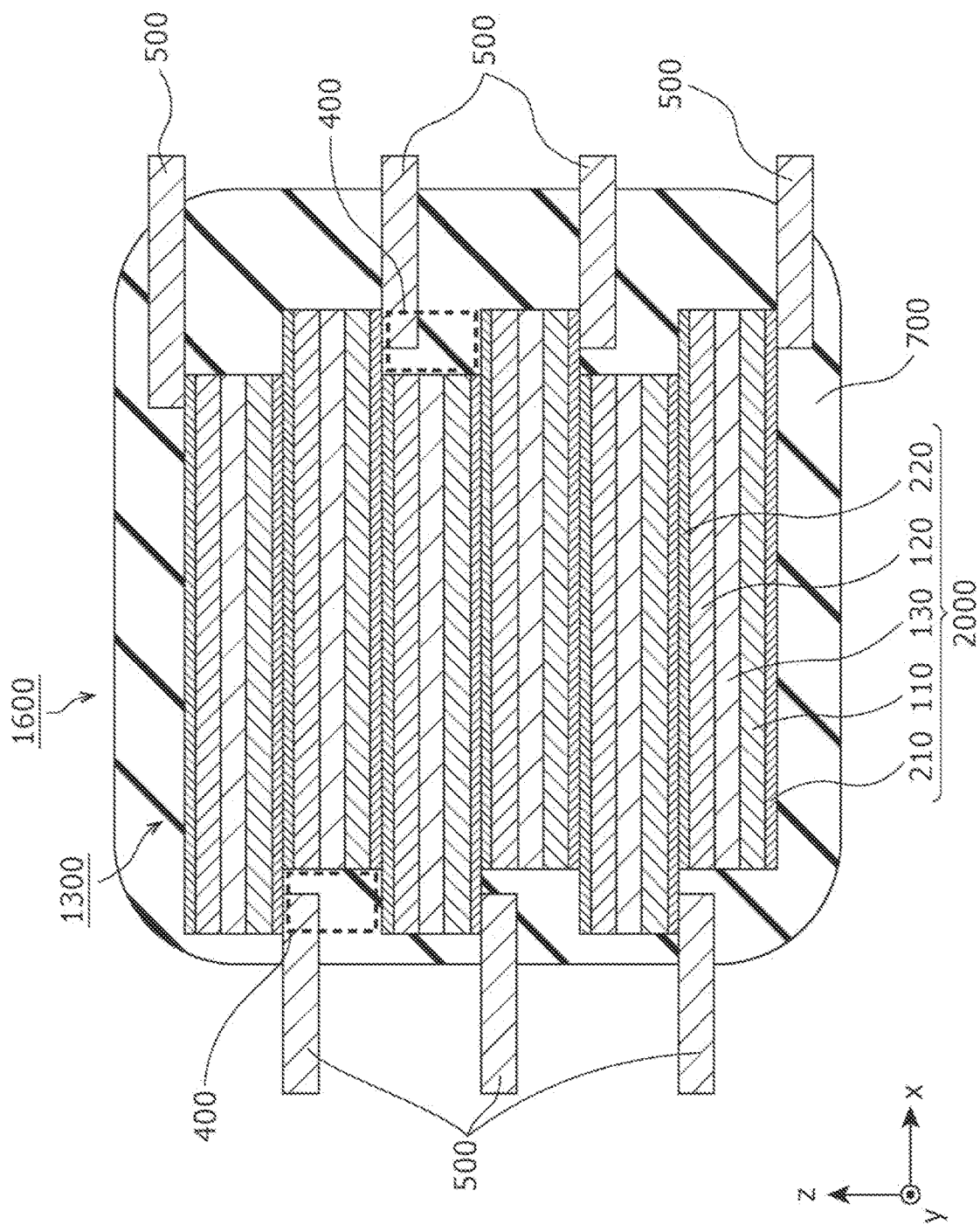
FIG. 7 is a cross-sectional view showing another example of the schematic structure of the laminated battery in embodiment 2.
Figure 8:
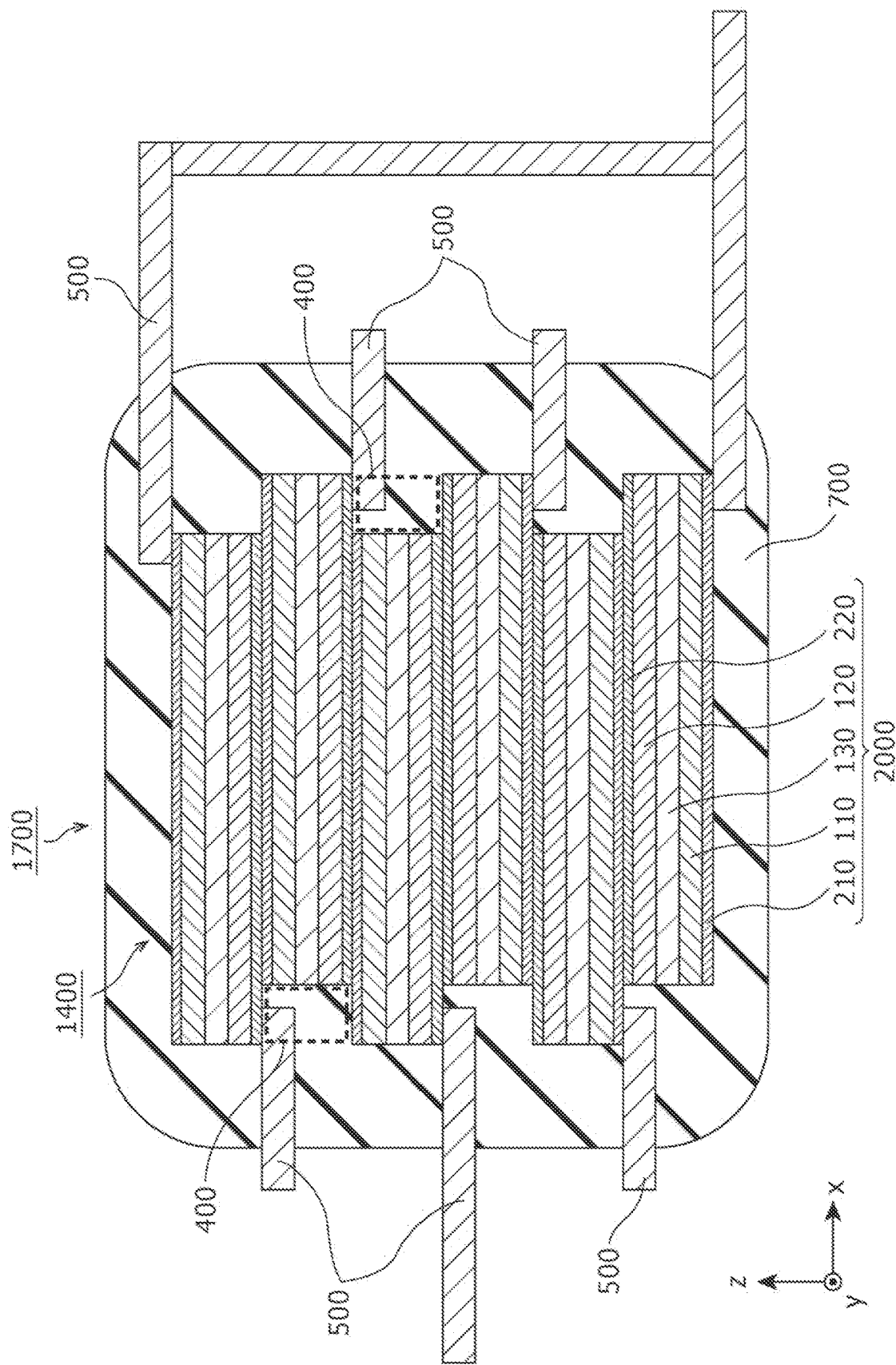
FIG. 8 is a cross-sectional view showing another example of the schematic structure of the laminated battery in embodiment 2.

Each of the laminated batteries shown in embodiment 1 and the modifications described above may further include a sealing member 700. FIGS. 6, 7, and 8 show examples of the laminated battery including the sealing member 700. FIGS. 6, 7, and 8 are cross-sectional views showing schematic structures of laminated batteries 1500, 1600, and 1700, respectively, in embodiment 2. Specifically, FIG. 6 shows the laminated battery 1500 including the sealing member 700 disposed around the peripheral parts of the laminated battery 1000 in embodiment 1. FIG. 7 shows the laminated battery 1600 including the sealing member 700 disposed around the peripheral parts of the laminated battery 1300 in modification 3 of embodiment 1. FIG. 8 shows the laminated battery 1700 including the sealing member 700 disposed around the peripheral parts of the laminated battery 1400 in modification 4 of embodiment 1.

The sealing member 700 is formed using, for example, an electrically insulating material. The sealing member 700 functions also as a spacer for maintaining the laminating spaces 400.

For example, the sealing member 700 is a member containing a first material. The sealing member 700 may be, for example, a member containing the first material as a main component. The sealing member 700 may be a member formed only of the first material.

The first material used may be a well-known sealing member material for batteries such as a sealing agent. The first material used may be, for example, a resin material. The first material may be an insulating material having no ionic conductivity. The first material may be, for example, at least one of an epoxy resin, an acrylic resin, a polyimide resin, and silsesquioxane.

The sealing member 700 may contain a particulate metal oxide material. The metal oxide material used may be silicon oxide, aluminum oxide, titanium oxide, zinc oxide, cerium oxide, iron oxide, tungsten oxide, zirconium oxide, calcium oxide, zeolite, or glass. For example, the sealing member 700 may be formed using a resin material containing a plurality of metal oxide material particles dispersed therein.

It is only necessary that the particle size of the metal oxide material be equal to or lower than the gap between the negative electrode current collector 210 and the positive electrode current collector 220. The metal oxide material particles may have a circular (spherical) shape, an ellipsoidal shape, or a rod-like shape.

By disposing the sealing member 700, the reliability of the laminated battery can be improved because the mechanical strength is improved, a short circuit is prevented, and moisture resistance is obtained. In this structure, the sealing member 700 is filled into the laminating spaces 400. Therefore, the sealing member 700 is less likely to peel off than when no laminating spaces 400 are provided, so that the laminated battery obtained is firmly sealed.

Embodiment 3

Embodiment 3 will next be described. In the following description, differences from embodiments 1 and 2 and the modifications will be mainly described, and the description of common features will be omitted or simplified.

Figure 9:
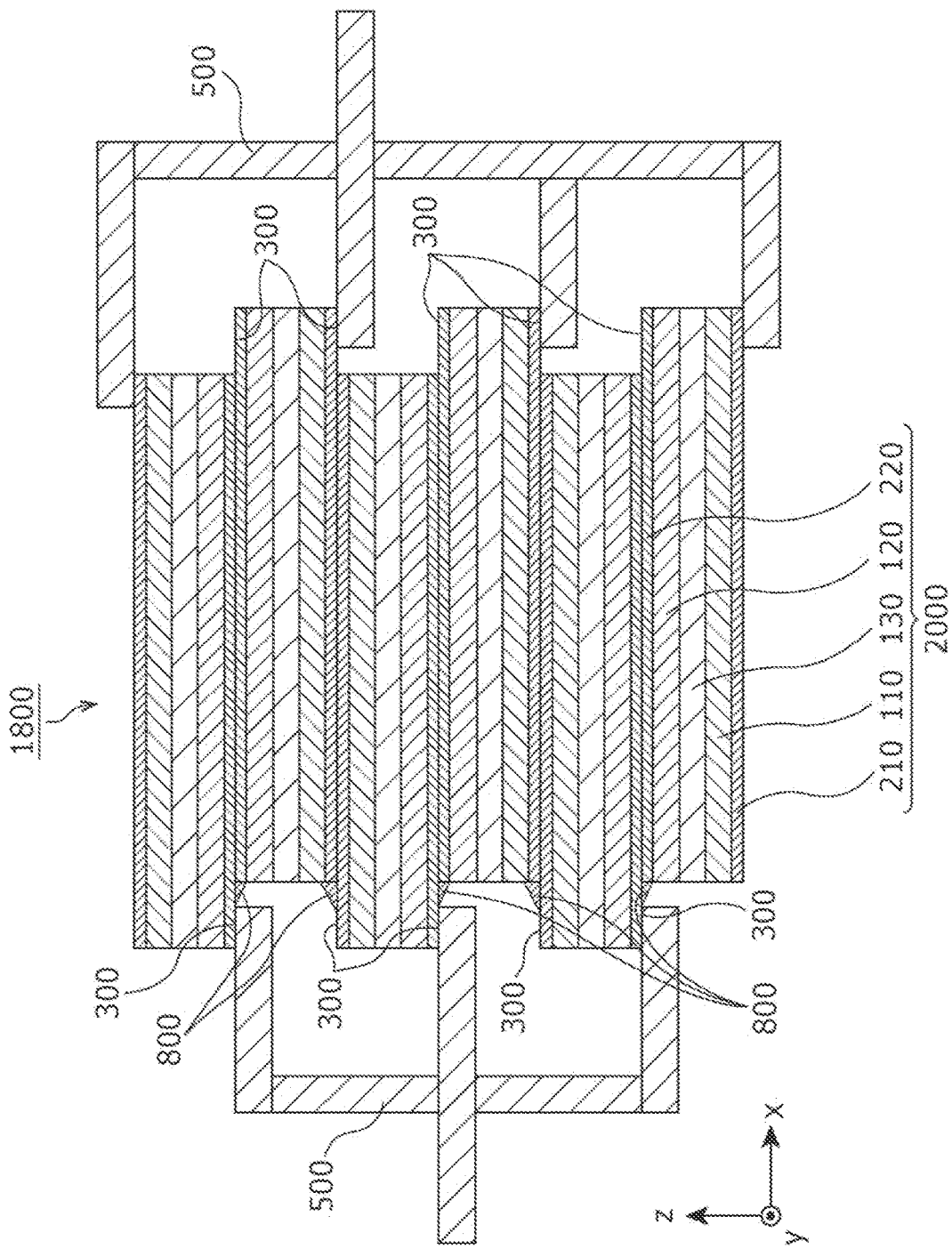
FIG. 9 is a cross-sectional view showing a schematic structure of a laminated battery in embodiment 3.

FIG. 9 is a cross-sectional view showing a schematic structure of a laminated battery 1800 in embodiment 3. Specifically, FIG. 9 shows the laminated battery 1800 including joint portions 800 formed in the laminated battery having the same structure as that of the laminated battery 1000 in embodiment 1.

As show in FIG. 9, in two adjacent battery cells 2000 including a first battery cell 2000 and a second battery cell 2000, an exposed surface 300 of the first battery cell 2000 is joined to the second battery cell 2000 through a joint portion 800 formed of an electrically conductive material. Specifically, in the two adjacent battery cells 2000, the exposed surface 300 of the first battery cell 2000 is joined to the negative electrode current collector 210 or the positive electrode current collector 220 of the second battery cell 2000 through the joint portion 800.

It is only necessary that, in the joint portions 800, the exposed surfaces 300 be joined to the respective current collectors using the electrically conductive material. No particular limitation is imposed on the electrically conductive material forming the joint portions 800, so long as it is a material having high electric conductivity. The electrically conductive material used may be a metal such as silver, nickel, stainless steel, aluminum, or copper. The electrically conductive material used may be an electrically conductive adhesive. The joint portions 800 may be formed, for example, by welding the exposed surfaces 300 to the current collectors to be joined thereto through the electrically conductive material or may be formed by partially fusing the exposed surfaces 300 and the current collectors to be joined thereto.

Since the joint portions 800 are formed in the laminated battery 1800, the mechanical bonding and electrical bonding between the battery cells 2000 are further improved, and the connection impedance between the battery cells 2000 is reduced. Therefore, advantageous effects such as a reduction in heat generation and an improvement in large-current characteristics can be obtained.

Other Embodiments

The laminated battery according to the present disclosure has been described based on the embodiments, but the present disclosure is not limited to these embodiments. Various modifications of the embodiments that are conceivable by those skilled in the art as well as other embodiments obtained by combining some of the components in the embodiments are included in the scope of the present disclosure so long as they do not depart from the scope of the present disclosure.

Various modifications, replacements, additions, omissions, etc. may be made to the above embodiments within the scope of the claims or equivalents thereof.

For example, in the above embodiments, the exposed surfaces are formed by laminating the plurality of battery cells such that they are displaced from each other in the x-axis direction, but this is not a limitation. In the laminated battery, the plurality of battery cells which are laminated may be displaced from each other in the y-axis direction, or a combination of a structure in which a plurality of battery cells are laminated so as to be displaced from each other in the x-axis direction and a structure in which a plurality of battery cells are laminated so as to be displaced from each other in the y-axis direction may be used. The exposed surfaces may be formed by laminating battery cells that have different widths in the x- or y-axis direction.

In the above embodiments, all the plurality of battery cells have the respective exposed surfaces, but this is not a limitation. A battery cell having no exposed surface may be provided by adjusting the shapes of the battery cells and their laminating positions so as to be suitable for the intended connection portions of the current collecting leads.

In the above embodiments, only the current collecting leads are formed on the exposed surfaces, but this is not a limitation. To improve reliability, insulating layers formed of an insulating material such as a resin may be provided on surfaces of the current collecting leads that are opposite to their surfaces connected to the exposed surfaces. Moreover, insulating layers formed of an insulating material such as a resin may be provided on portions of the exposed surfaces other than their portions connected to the current collecting leads or portions of the exposed surfaces to which the current collecting leads are not connected.

In the above embodiments, the shape of the battery cells in top view is rectangular, but this is not a limitation. The shape of the battery cells in top view may be circular, elliptic, or polygonal.

In the above embodiments, the thickness of the current collecting leads is constant, but this is not a limitation. The current collecting leads may have different thicknesses in different portions. For example, portions of the current collecting leads other than their portions having the exposed surfaces may have an increased thickness suitable for the intended purpose.

In the above embodiments, the current collecting leads are connected to the exposed surfaces of the battery cells forming the laminated battery, but this is not a limitation. The laminated battery may include a battery cell in which no current collecting lead is connected to its exposed surface. The exposed surface to which no current collecting lead is connected may be used, for example, as a surface with which a terminal, for example, is to be brought into contact from the outside or a surface on which a mark for identification, for example, is displayed.

The laminated battery according to the present disclosure can be used as a battery for electronic devices, electric appliances, electric vehicles, etc.

What is claimed is:

1. A laminated battery comprising:
    a plurality of battery cells which are laminated in a laminating direction; and
    a current collecting lead,
    wherein each of the plurality of battery cells has a structure in which a positive electrode current collector, a positive electrode active material layer, a solid electrolyte layer, a negative electrode active material layer, and a negative electrode current collector are laminated in this order in the laminating direction,
    wherein the plurality of battery cells include a first battery cell and a second battery cell that are adjacent to each other,
    the first battery cell has a surface facing the second battery cell,
    the surface facing the second battery cell includes an exposed surface that is not in contact with the second battery cell,
    at least part of the exposed surface does not overlap the second battery cell when viewed from the laminating direction of the plurality of battery cells,
    the current collecting lead is physically connected to the exposed surface,
    at least two of the plurality of battery cells have the same shape, and
    the plurality of battery cells are electrically connected in parallel or series.

2. The laminated battery according to claim 1, wherein a thickness of the current collecting lead in the laminating direction at a position at which the current collecting lead overlaps the exposed surface when viewed from the laminating direction is smaller than a thickness of the second battery cell in the laminating direction.

3. The laminated battery according to claim 1, wherein a thickness of the current collecting lead in the laminating direction at a position at which the current collecting lead overlaps the exposed surface when viewed from the laminating direction is larger than a thickness of the positive electrode current collector included in the second battery cell in the laminating direction or a thickness of the negative electrode current collector included in the second battery cell in the laminating direction.

4. The laminated battery according to claim 1, wherein a position of a side surface of the first battery cell and a position of a side surface of the second battery cell are displaced from each other in a direction perpendicular to the laminating direction.

5. The laminated battery according to claim 1, wherein each of the plurality of battery cells has a first side surface parallel to the laminating direction and a second side surface opposite to the first side surface, and
    the plurality of battery cells are disposed such that battery cells displaced in a first side surface direction and battery cells displaced in a second side surface direction are arranged alternately.

6. The laminated battery according to claim 1, wherein the second battery cell has a concave portion that is an inwardly recessed edge portion of the second battery cell when viewed from the laminating direction, and
    at least part of a recessed inner region of the concave portion overlaps the at least part of the exposed surface of the first battery cell when viewed from the laminating direction.

7. The laminated battery according to claim 6, wherein, when viewed from the laminating direction, positions of edge portions of the plurality of battery cells are the same except for the concave portion.

8. The laminated battery according to claim 1, wherein the exposed surface of the first battery cell and the second battery cell are joined together through a joint portion formed of an electrically conductive material.

9. The laminated battery according to claim 1, wherein the exposed surface is a surface of the positive electrode current collector included in the first battery cell or a surface of the negative electrode current collector included in the first battery cell.

10. The laminated battery according to claim 1, wherein the negative electrode active material layer, the positive electrode active material layer, and the solid electrolyte layer in each of the plurality of battery cells are flat plates held parallel to each other in a direction perpendicular to the laminating direction.

11. The laminated battery according to claim 1, wherein the surface facing the second battery cell is a surface of the positive electrode current collector included in the first battery cell or a surface of the negative electrode current collector included in the first battery cell.

12. The laminated battery according to claim 1, wherein each of the plurality of battery cells as a whole is parallel to each other in a direction perpendicular to the laminating direction.

13. The laminated battery according to claim 1, wherein each of the plurality of battery cells as a whole is series to each other in the laminating direction.

* * * * *